United States Patent
Leman et al.

(10) Patent No.: US 7,506,625 B2
(45) Date of Patent: Mar. 24, 2009

(54) METHOD AND APPARATUS FOR CONTROLLING ENGINE VALVE TIMING

(75) Inventors: Scott Alan Leman, Eureka, IL (US); Jason Kenneth Bloms, Peoria, IL (US); Steven James Funke, Mapelton, IL (US); James Richard Weber, Lacon, IL (US)

(73) Assignee: Caterpillar Inc., Peoria, IL (US)

( * ) Notice: Subject to any disclaimer, the term of this patent is extended or adjusted under 35 U.S.C. 154(b) by 110 days.

(21) Appl. No.: 11/394,121

(22) Filed: Mar. 31, 2006

(65) Prior Publication Data

US 2007/0234991 A1 Oct. 11, 2007

(51) Int. Cl.
*F02N 17/00* (2006.01)
(52) U.S. Cl. .................................. 123/179.3
(58) Field of Classification Search .............. 123/179.3, 123/179.4, 179.5, 179.16, 179.18
See application file for complete search history.

(56) References Cited

U.S. PATENT DOCUMENTS

| | | | |
|---|---|---|---|
| 4,960,094 A | 10/1990 | Koike et al. | |
| 4,960,095 A | 10/1990 | Koike et al. | |
| 5,465,589 A | 11/1995 | Bender et al. | |
| 6,058,897 A | 5/2000 | Nakayoshi | |
| 6,357,409 B1 * | 3/2002 | Haghgooie et al. | 123/179.3 |
| 6,450,137 B2 | 9/2002 | Ogawa | |
| 6,637,394 B2 * | 10/2003 | Marshall et al. | 123/179.3 |
| 6,679,214 B2 * | 1/2004 | Kobayashi et al. | 123/179.4 |
| 6,772,724 B2 * | 8/2004 | Glugla et al. | 123/179.5 |
| 6,988,477 B2 * | 1/2006 | Kataoka et al. | 123/179.18 |
| 7,146,959 B2 * | 12/2006 | Thompson et al. | 123/179.4 |
| 2001/0003971 A1 * | 6/2001 | Hori et al. | 123/90.11 |
| 2003/0172892 A1 | 9/2003 | Glugla et al. | |
| 2005/0257760 A1 | 11/2005 | Kato et al. | |

FOREIGN PATENT DOCUMENTS

| | | |
|---|---|---|
| EP | 1 070 833 | 1/2001 |
| EP | 1 247 951 | 10/2002 |
| JP | 2000-45723 | 2/2000 |
| JP | 2001-241307 | 9/2001 |
| JP | 2001-329812 | 11/2001 |

OTHER PUBLICATIONS

PCT Search Report, PCT/US2007/004819; International Filing Date: Feb. 23, 2007; Priority Date: Mar. 31, 2006; Applicant: Caterpillar Inc.

* cited by examiner

*Primary Examiner*—Stephen K Cronin
*Assistant Examiner*—Arnold Castro
(74) *Attorney, Agent, or Firm*—Finnegan, Henderson, Farabow, Garrett & Dunbar

(57) ABSTRACT

A method of controlling an engine during an engine startup or shutdown condition includes operating a valve to open a port of a combustion chamber to allow fluid to flow between the combustion chamber and the port for at least one entire engine cycle. The method also includes preventing combustion of fuel during a combustion stroke of the at least one engine cycle. The engine cycle occurs during the engine startup or shutdown condition.

13 Claims, 4 Drawing Sheets

METHOD AND APPARATUS FOR CONTROLLING ENGINE VALVE TIMING

TECHNICAL FIELD

The present disclosure relates generally to a method of controlling engine valves, and more particularly, to a method of controlling engine valve timing.

BACKGROUND

Many truck models include compartments that include sleeping accommodations so that truck drivers may rest in their cabs. In order to provide an environment conducive to resting and sleeping, many trucks are provided with heating and/or air-conditioning in their cabs.

One method of operating an air-conditioning system in a truck while the driver sleeps is described in U.S. Pat. No. 5,465,589 ("the '589 patent") issued to Bender et al. The '589 patent describes an air-conditioning system that operates while an engine in the truck is idling. The driver parks the truck and leaves the engine running. As the driver sleeps, the air-conditioning system continuously draws power from the engine.

Although the air-conditioning system of the '589 patent continuously operates while the driver sleeps, the engine must idle continuously while the driver is sleeping. Truck engines are designed and built to operate optimally at highway speeds. Accordingly, trucks at idle vibrate and may cause uneven or undesired noise levels, which may disturb the driver's sleep. Also, operating trucks at idle for long amounts of time may increase wear and tear on engine parts, thereby decreasing engine life. In addition, fuel is consumed while the engine is idling. Furthermore, undesirable emissions are generated when idling an internal combustion engine, such as, for example, a diesel, gasoline, or gaseous fuel driven engine. These emissions, which may include particulates and oxides of nitrogen (NOx), are generated when fuel is combusted in a combustion chamber of the engine. An exhaust stroke of a piston forces exhaust gas, which may include these emissions, from the engine. If no emission reduction measures are in place, these undesirable emissions will eventually be exhausted to the environment.

The disclosed system is directed to overcoming one or more of the problems set forth above.

SUMMARY OF THE INVENTION

In one aspect, the present disclosure is directed to a method of controlling an engine during an engine startup or shutdown condition. The method includes operating a valve to open a port of a combustion chamber to allow fluid to flow between the combustion chamber and the port for at least one entire engine cycle. The method also includes preventing combustion of fuel during a combustion stroke of the at least one engine cycle. The engine cycle occurs during the engine startup or shutdown condition.

In another aspect, the present disclosure is directed to an engine. The engine includes a combustion chamber including a port, a valve configured to open or close the port, and a controller configured to control the valve to open or close the port for at least one entire engine cycle. The controller is also configured to prevent combustion of fuel during a combustion stroke of the engine cycle. The engine cycle occurs during an engine startup or shutdown condition.

In yet another aspect, the present disclosure is directed to a method of starting up an engine. The method includes activating a motor to transfer motion to a piston associated with a combustion chamber, increasing an engine speed using the motor, operating a valve to open a port of the combustion chamber, and preventing combustion of fuel in the combustion chamber during at least one combustion stroke.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
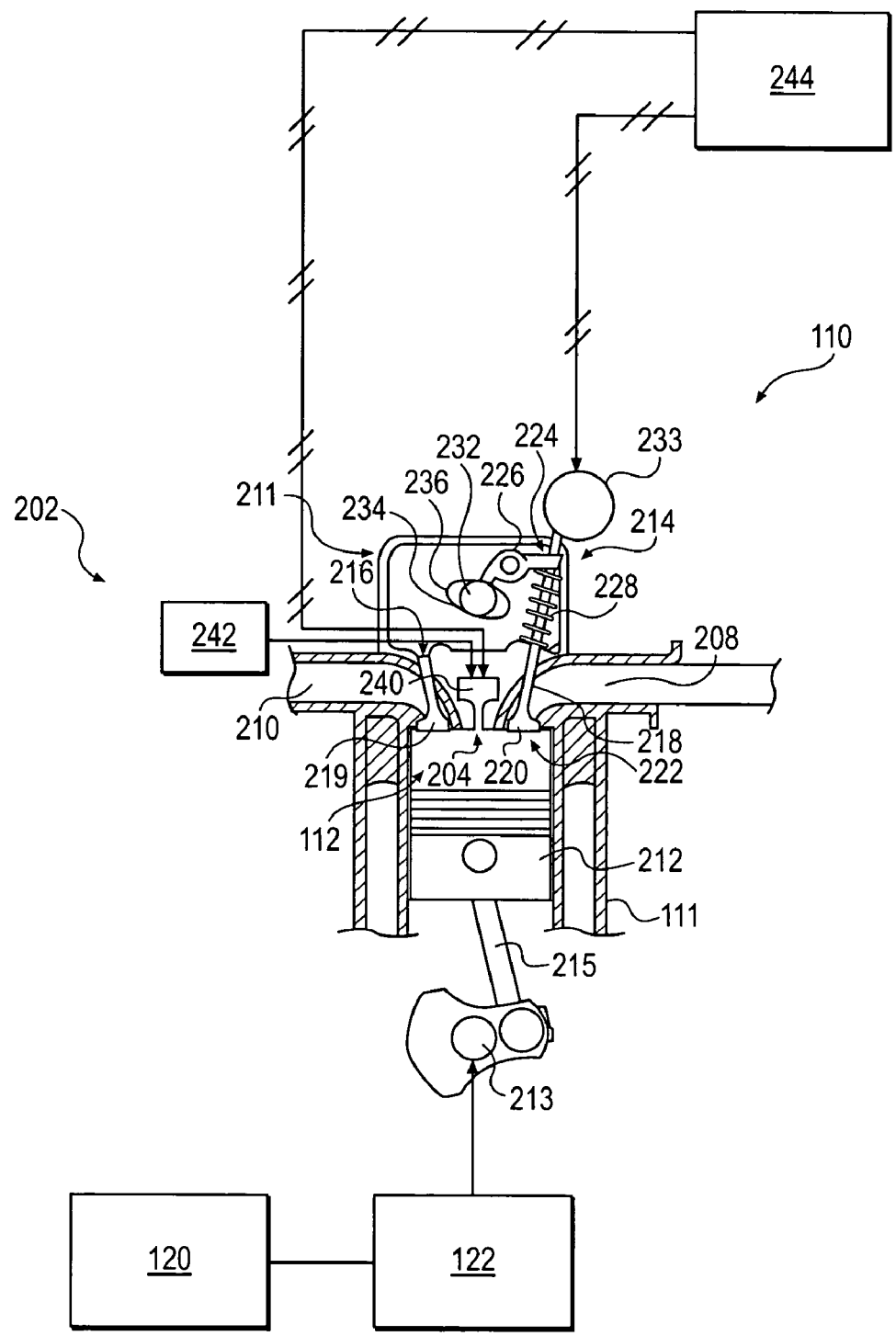
FIG. 1 is a combination diagrammatic and schematic illustration of an example of a combustion chamber of an internal combustion engine and an engine valve actuator.

Referring to FIG. 1, a power source, such as an engine 110, is provided. The engine 110 may be, for example, a four-stroke, internal combustion diesel engine, and it is to be understood that the teachings of the disclosure can be employed in conjunction with any other type of engine, for example, a gasoline engine and/or an engine operated with a cycle having a different number of strokes.

The engine 110 includes an engine block 111 defining at least one combustion chamber 112, one of which is shown in FIG. 1. The number of the combustion chambers 112 in the engine 110 depends upon the particular application. The exemplary embodiments described herein include one and six combustion chambers 112, respectively.

The engine 110 may include a piston 212 in aligned fashion with each of the combustion chambers 112. The pistons 212 are positioned sequentially in the engine block 111, e.g., in an in-line or V configuration. The piston 212 in each of the combustion chambers 112 may be slidably movable in the combustion chamber 112.

A crankshaft 213 may be rotatably disposed within the engine block 111 and supported by bearings (not shown). A connecting rod 215 may couple the piston 212 to the crankshaft 213 so that sliding motion of the piston 212 within the combustion chamber 112 results in rotation of the crankshaft 213. Similarly, rotation of the crankshaft 213 results in a sliding motion of the piston 212. As will be referenced below, an uppermost position of the piston 212 in the combustion chamber 112 corresponds to a top dead center ("TDC") position of the piston 212, and a lowermost position of the piston 212 in the combustion chamber 112 corresponds to a bottom dead center ("BDC") position of the piston 212. The connecting rod 215 connects to each of the pistons 212 and to the crankshaft 213 so as to capitalize on the motion of the piston 212 to produce useful work in a machine (not shown) with which the engine 110 is associated.

Figure 2:
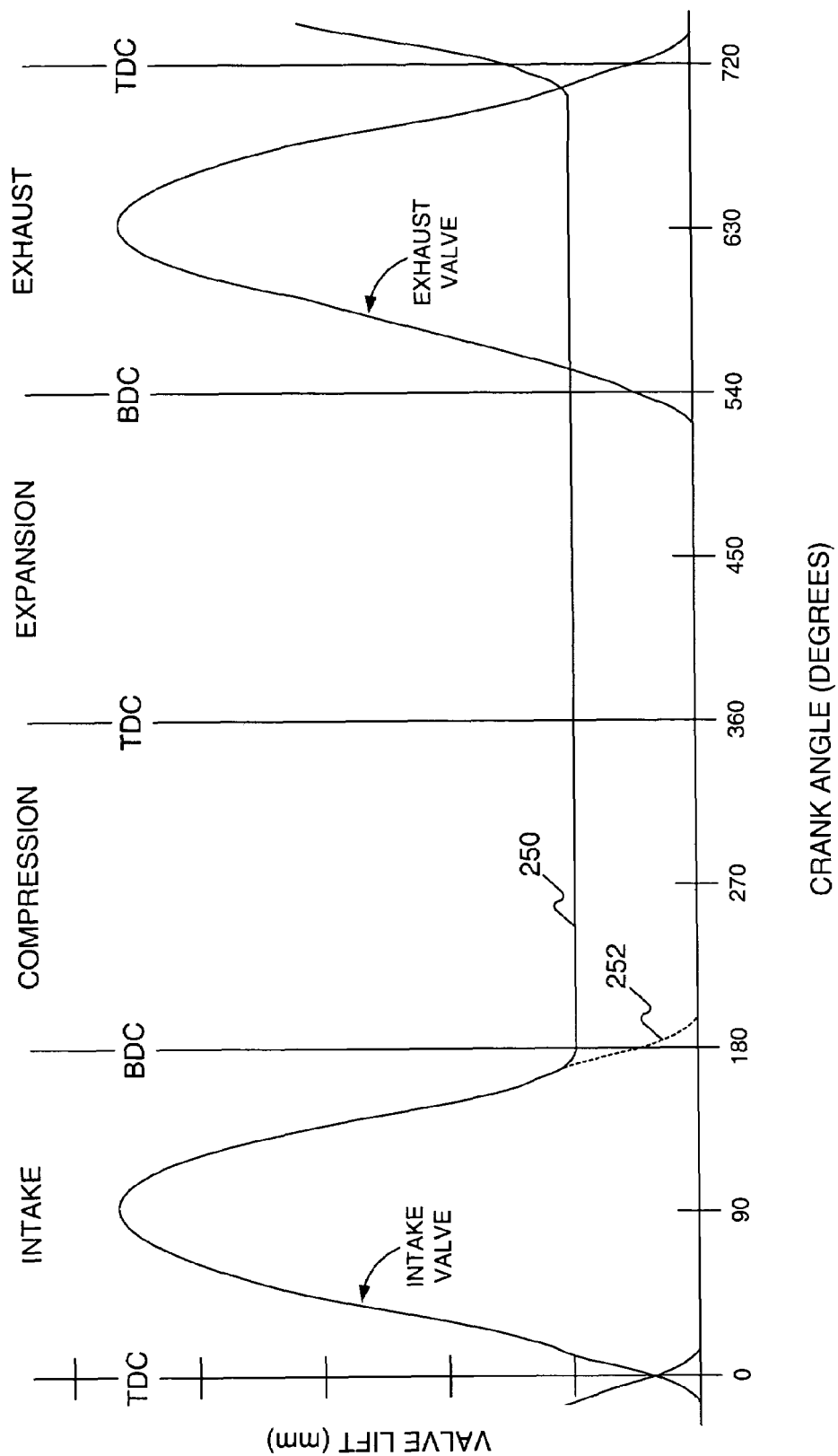
FIG. 2 is a graph plotting valve lifts as a function of engine crank angle during engine startup or shutdown in accordance with an exemplary embodiment.

As one skilled in the art will recognize, in a four-stroke engine cycle, the piston 212 reciprocates in the combustion chamber 112 from the uppermost position to the lowermost position (or from the lowermost position to the uppermost position) during each of the four strokes. In particular, the piston 212 reciprocates from the TDC position to the BDC position during a first stroke (intake stroke), from the BDC position to the TDC position during a second stroke (compression stroke), from the TDC position to the BDC position during a third stroke (expansion stroke), and from the BDC position to the TDC position during a fourth stroke (exhaust stroke). Then, the four-stroke cycle begins again. Each piston stroke correlates to about 180° of crankshaft rotation, or crank angle. As shown in FIG. 2, when the intake stroke begins at a reference crank angle, such as 0°, the compression stroke begins at about 180°, the expansion stroke at about 360°, and the exhaust stroke at about 540°. When there is more than one combustion chamber 112, then there may be a phase difference between the pistons 212 of each of the combustion chambers 112. As a result, each of the pistons 212 are in different stages of the engine cycle, which corresponds to different angles of crankshaft rotation (crank angles) when the engine 110 is running.

As known in the art, the engine 110 may be connected to a conventional start system. The conventional start system may include a battery 120 and a starter motor 122 that is operatively connected to the crankshaft 213. An ignition command is issued to start the engine 110, such as, for example, by turning a key, by pressing a button, or by sending a signal from a controller 244, the battery 120 applies a voltage to the starter motor 122. The applied voltage causes the starter motor 122 to rotate the crankshaft 213. The induced rotation of the crankshaft 213 may move the pistons 212, thereby starting the engine 110. Alternatively, the starter motor 122 may be replaced with another type of motor, such as an electric, hydraulic, or pneumatic motor.

Each of the combustion chambers 112 may be defined by the engine block 111, the piston 212, and a cylinder head 211. An intake port 208 and an exhaust port 210 may be provided in the cylinder head 211 to allow for fluid communication into and out of the combustion chamber 112. In addition, while FIG. 1 depicts only one intake port 208 and one exhaust port 210 per combustion chamber 112, it is to be understood that a pair of intake ports 208 and a pair of exhaust ports 210 may be provided in each combustion chamber 112. In some modes of engine operation, air may enter the combustion chamber 112 through the intake ports 208 while air or combustion or exhaust gases may exit the combustion chamber 112 through the exhaust ports 210.

Each intake port 208 and exhaust port 210 opens to the combustion chamber 112. The intake port 208 may be opened and closed by an intake valve 218 of an intake valve assembly 214, and the exhaust port 210 may be opened and closed by an exhaust valve 219 of an exhaust valve assembly 216. The intake valve 218 may include, for example, a valve head 220 at a first end 222, with the valve head 220 being sized and arranged to selectively close the intake port 208. A second end 224 of the intake valve 218 may be connected to a rocker arm 226 or any other valve-actuating mechanism. The intake valve 218 may be movable between a first position permitting flow through the intake port 208 to enter the combustion chamber 112 and a second position substantially blocking flow through the intake port 208 to the combustion chamber 112. A valve spring 228 imparts a force that biases the corresponding valve head 220 into sealing engagement with the valve port 208 to bring the intake valve 218 to the second, closed position. A camshaft 232 carrying a cam 234 with one or more lobes 236 may be arranged to operate the intake valve assembly 214 cyclically based on the configuration of the cam 234, the lobes 236, and the rotation of the camshaft 232. The exhaust valve assembly 216 may be configured in a manner similar to the intake valve assembly 214.

Alternatively (or additionally), the intake valve assembly 214 and/or the exhaust valve assembly 216 may be operated hydraulically, pneumatically, electronically, or by any combination of mechanics, hydraulics, pneumatics, and/or electronics. For example, a valve actuator 233 operated hydraulically, pneumatically, electronically, mechanically, or any combination thereof may be provided to hold open the valves 218, 219 for longer periods or for timing sequences other than that dictated by a cam. In the exemplary embodiment shown in FIG. 1, the cam 234 and the valve actuator 233 are both provided to open and close the intake valve 218. It is understood that a separate cam 234 and valve actuator 233 may also be provided to open and close the exhaust valve 219.

The valve actuator 233 is structured and arranged to selectively interrupt cyclical movement of and delay the closing of the intake valve 218. The valve actuator 233 may be selectively operated to supply hydraulic fluid, for example, pressurized fluid, to resist the closing of the intake valve 218 by the bias of the spring 228, as described below in connection with the valve actuator 233. That is, after the intake valve 218 is lifted, i.e., opened, by the cam 234, the valve actuator 233 may move hydraulically to abut the intake valve 218 to hold the intake valve 218 open for a desired period. The valve actuator 233 may then be hydraulically locked for a desired period depending on the desired performance of the engine 110. The pressurized hydraulic fluid may be drained/released from the valve actuator 233 to allow the intake valve 218 to close and return to the normal actuation provided by the camshaft 232. Thus, the valve actuator 233 may enable the engine 110 to operate under a conventional Otto or diesel cycle, under a variable late-closing and/or variable early-closing Miller cycle, or under another mode of operation in which the timing of the opening and/or closing of the intake valve 218 is modified from a conventional Otto or Miller cycle.

Optionally, the valve actuator 233 may be connected to a pump, such as an electrically-driven oil pump, to increase the pressure of the hydraulic fluid used in the valve actuator 233, for example, when the engine 110 is starting up and the pressure of the fluid is relatively low. A control valve may be included with the valve actuator 233 to control the supply/draining of hydraulic fluid thereto.

Each combustion chamber 112 is also provided with a fuel supply system 202. The fuel supply system 202 may include a fuel port 204 opening to the combustion chamber 112 and may inject fuel, for example, diesel fuel, directly into the combustion chamber 112. The fuel supply system 202 may include a fuel injector assembly 240 that may inject or otherwise spray fuel into the combustion chamber 112 via the fuel port 204 in accordance with a desired timing. For example, the fuel injection assembly 240 may be a mechanically-actuated, electronically-controlled unit injector, in fluid communication with a common fuel rail 242. In a common rail type injector, the common fuel rail 242 provides fuel to the fuel injector assembly 240 associated with each combustion chamber 112. Alternatively, the fuel injector assembly 240 may be actuated and/or operated hydraulically, mechanically, electrically, piezoelectrically, or any combination thereof.

The controller 244 may be a control module or processor, and the functions of the controller 244 may be performed by a single controller or by a plurality of controllers. The controller 244 may be electrically connected to the valve actuator 233 and/or the fuel injector assembly 240 so that the valve actuator 233 and/or the fuel injector assembly 240 may be actuated upon receipt of a control signal or the like from the controller 244.

The controller 244 may also be electrically connected to at least one sensor for determining at least one operating condition of the engine 110. For example, a crankshaft position sensor may be connected to the controller 244 to determine crankshaft position and/or engine speed. The crankshaft position sensor may deliver signals to the controller 244 to allow the controller 244 to control fuel injection, ignition timing, and other functions.

INDUSTRIAL APPLICABILITY

The disclosed method of controlling engine valve timing during engine startup and/or shutdown may be applicable to any work machine that includes an engine with a mechanism for varying the timing of one or more of the valves. The valve timing may be modified to hold one or more valves open during the startup and shutdown periods. The exemplary embodiments described below provide modified timing procedures for the intake valves. However, the same procedures may be used for exhaust valves. The disclosed method of controlling the engine valves supports an anti-idling strategy, which decreases the need for idling an engine, and may reduce engine emissions and improve fuel economy and engine life.

The engine 110 can be used in a variety of applications. For example, the engine 110 may be provided on board a prime-mover, vehicle, or the like, or any type of machine requiring mechanical or electrical energy. Such machines may include, but are not limited to, earth moving machines, backhoes, graders, rock crushers, pavers, skid-steer loaders, cranes, automobiles, trucks, and the like. In an exemplary embodiment, the engine 110 may be capable of recharging an energy storage device, such as a battery in a truck having sleeping accommodations for a driver. The energy storage device may be used to provide power for a smaller engine or for various accessories or systems, e.g., heating, ventilation, and air-conditioning systems, in the truck.

When the driver is resting in the sleeping accommodations in the truck, the engine 110 may be shut off and the accessories may be powered by the energy storage device. As a result, the engine 110 does not idle for these extended periods of time, thereby complying with an anti-idling strategy that minimizes emissions, reduces wear and tear on the engine parts, increases engine life, and improves fuel economy.

The controller 244 may monitor available power levels in the energy storage device and may automatically initiate engine startup when the power level of the energy storage device drops below a predetermined threshold. After starting up the engine 110, the engine 110 may recharge the energy storage device. When the engine 110 is recharging the energy storage device, the engine 110 may operate in a known manner using, for example, the diesel principle of operation. After the energy storage device is completely recharged, the controller 244 may initiate engine shutdown. Alternatively, the controller 244 may be programmed to initiate engine startup and/or shutdown automatically based on a predetermined timed schedule, e.g., regularly at predetermined time intervals, or based on another operating condition.

As shown in FIG. 2, the closure timing of the intake valve 218 is selectively varied when the engine 110 is starting up or shutting down, which may last for short periods of time, e.g., on the order of a few seconds. Engine operation is plotted across 720° of crank angle, and each of the four strokes represent 180° of crank angle. The closure timing of the intake valve 218 is varied using the profile of the cam 234 and control of the valve actuator 233. It is to be understood that the following process may be implemented at other times during the operation of the engine 110 and is not limited to engine startup and shutdown as described herein for the exemplary embodiments.

Figure 3:
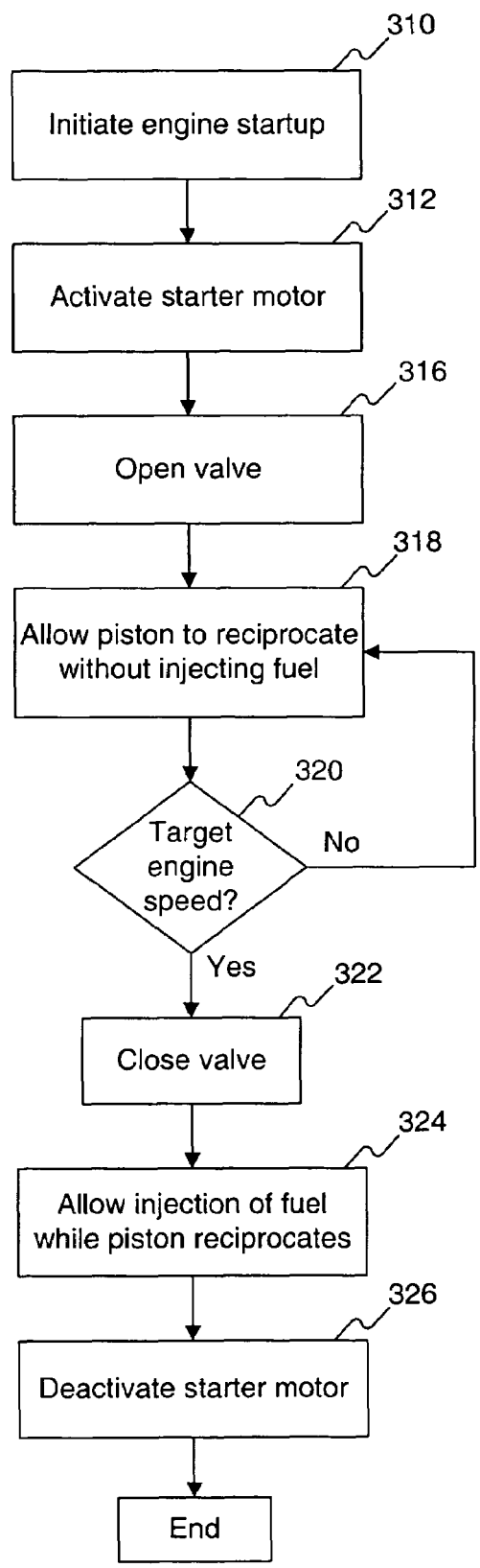
FIG. 3 is a flow chart depicting an exemplary procedure for starting up an engine.

Referring now to FIG. 3, the operation of the engine 110 including one combustion chamber 112 during engine startup is described in detail below. Engine startup may be characterized as starting when the engine speed is zero and ending when the engine speed is faster than the speed produced by the starter motor 122. Then, the starter motor 122 may be deactivated or disengaged from the engine 110. The speed of the starter motor 122 depends on various factors, such as the temperature of the surrounding environment and/or an amount of power produced by the starter motor 122. Alternatively, the completion of engine startup may occur when the engine 110 is able to spin on its own, i.e., when the combustion cylinders 112 are firing. As another alternative, the completion of the engine startup may occur when the engine speed has reached a target idle speed, e.g., 600 revolutions per minute.

The controller 244 initiates engine startup, as indicated in step 310. In the energy storage device recharging system described above, the controller 244 initiates engine startup when the controller 244 determines that the power level of the energy storage device has dropped below a predetermined threshold. Alternatively, the controller 244 may begin engine startup based on other conditions, e.g., predetermined time interval, or after receiving a signal from another component or sensor, e.g., when a key is inserted and/or turned in the ignition or when a button is pressed. At this time, if the valve actuator 233 is hydraulically-operated, the controller 244 may actuate the pump to pressurize the hydraulic fluid in the pressurized fluid source.

The controller 244 sends a signal to the battery 120 to apply a voltage to the starter motor 122, as indicated in step 312. The applied voltage causes the starter motor 122 to rotate the crankshaft 213, which causes the pistons 212 to move. The engine speed begins increasing from zero speed to a non-zero speed.

When operating the intake valve 218 under a first timing procedure, the piston 212 reciprocates between the TDC position and the BDC position during four distinct strokes: the intake stroke, the compression stroke, the expansion stroke, and exhaust stroke. In the intake stroke of the first timing procedure, the intake valve assembly 214 is open to direct airflow into the combustion chamber 112. The piston 212 descends through the combustion chamber 112 away from the cylinder head 211 while the intake valve 218 is opened by the cam 234 at around the 0° crank angle, as indicated in step 316. In so doing, air supplied via the intake port 208 is drawn into the combustion chamber 112.

The controller 244 operates the valve actuator 233 to delay the closing of the intake valve 218. This delay in closing the intake valve 218 can be accomplished by allowing the cam 234 to open the intake valve 218 and then using the valve actuator 233 to maintain the intake valve 218 in an open position. Under the first timing procedure, the intake valve 218 typically remains open through multiple engine cycles. FIG. 2 illustrates the movement of the intake valve 218. As shown by the horizontal line 250 in FIG. 2, the valve lift is maintained open by the valve actuator 233 during the first timing procedure.

In the compression stroke of the first timing procedure, the piston 212 reverses its motion, at the direction of the rod 215. The intake valve 218 is held open as the piston 212 ascends to its uppermost position. At the same time, the exhaust valve 219 is closed. Air may pass through the intake port 208 during this compression stroke. Although the movement of the piston 212 reduces the volume in the combustion chamber 216, air is not substantially compressed since the intake valve 218 is held open during this so-called "compression" stroke. As a result, the effective compression ratio is reduced to zero.

In the expansion stroke of the first timing procedure, the piston 212 moves in a descending direction through the combustion chamber 112, while the exhaust valve 219 is closed and, again, the intake valve 218 remains open. Air may still pass through the intake port 208.

In the exhaust stroke of the first timing procedure, the piston 212 again reverses and ascends through the combustion chamber 112, but with the exhaust valve 219 open by the cam 234, thereby pushing the air out of the combustion chamber 112 via the exhaust port 210. Then, the exhaust valve 219 is closed. Again, the intake valve 218 remains open allowing fluid communication between the combustion chamber 112 and the intake port 208, and in the following intake stroke, the intake valve 218 is opened by the cam 234 again.

The four strokes described above are repeated while the intake valve 218 is held open. While the intake valve 218 is held open, the controller 244 controls the fuel injector assembly 240 so that fuel is not injected into the combustion chamber 112 during the compression and expansion strokes, as indicated in step 318.

The controller 244 monitors at least one operating condition to determine when to stop cycling the engine 110 using this first timing procedure and when to allow the intake valve 218 to close. In the exemplary embodiment, the controller 244 monitors engine speed, as indicated in step 320. For engine startup, the controller 244 may stop cycling the engine 110 using the first timing procedure when the engine 110 has reached a predetermined non-zero target speed, e.g., a target speed within a range of 300-1000 revolutions per minute. The target speed depends on various factors, e.g., an amount of torque required to spin the crankshaft 213 and the operating characteristics of the starter motor 122. Alternatively, the controller 244 may use other conditions, such as another engine condition or the amount of time elapsed since initiating engine startup.

When the controller 244 has determined that the target engine speed has been reached, the valve actuator 233 releases allowing the intake valve 218 to close, as indicated in step 322. Then, the intake valve 218 may be operated using a different timing procedure, e.g., a second timing procedure (described in detail below), to allow compression, fuel injection, and combustion in the combustion chamber 112, thereby allowing combustion to occur in the combustion chamber 112 and allowing the combustion chamber to fire, as indicated in step 324.

When the intake valve 218 operates under the second timing procedure, the intake valve 218 closes during each engine cycle to allow combustion to occur in the combustion chamber 112. The second timing procedure includes operating the combustion chamber 112 using a conventional Otto or diesel cycle, as described below. For example, the lobe 236 of the cam 234 may be configured to operate the intake valve 218 in a conventional Otto or diesel cycle, as shown by the dashed line 252 in FIG. 2. FIG. 2 shows that the intake valve 218 closes between about 10° before BDC of the intake stroke and about 10° after BDC of the compression stroke. Alternatively, the combustion chamber 112 may operate using a conventional Miller cycle or a modification of the Otto, diesel, or Miller cycles.

In the intake stroke of the second timing procedure, the piston 212 descends through the combustion chamber 112, the intake valve 218 is opened, and air is drawn into the combustion chamber 112. The intake valve 218 may be closed at the end of the intake stroke or during the compression stroke using the cam 234 and/or the valve actuator 233. The dashed line 252 of FIG. 2 shows an exemplary closing timing of the intake valve 218 during the second timing procedure.

In the compression stroke of the second timing procedure, the intake and exhaust valves 218, 219 are closed. Air is compressed as the piston 212 ascends through the combustion chamber 112 toward the cylinder head 211.

Fuel is injected into the combustion chamber 112 using the fuel injector assembly 240 and injected during the compression and/or expansion strokes (step 324). Combustion of the fuel is initiated by compression and ignition of the air/fuel mixture during the compression and/or expansion strokes. The resulting explosion and expanding gases push the piston 212 in a descending direction in the expansion stroke while the intake and exhaust valves 218, 219 remain closed.

In the exhaust stroke of the second timing procedure, the piston 212 ascends through the combustion chamber 112, but with the exhaust valve 219 open, thereby pushing the combustion gases out of the combustion chamber 112 via the exhaust port 210. Then, the exhaust valve 219 is closed. The lift of the exhaust valve 219 in the second timing procedure may be similar to the lift of the exhaust valve 219 in the first timing procedure as illustrated in FIG. 2.

After the controller 244 has signaled the fuel injector assembly 240 to begin injecting fuel into the combustion chamber 112, the starter motor 122 may be shut down, as indicated by step 326. For example, the starter motor 122 may be shut down when the engine speed is higher than the speed of the starter motor 122. Alternatively, the starter motor 122 may be deactivated when the engine 110 is able to spin on its own, i.e., when fuel is being injected into the combustion chambers 112. As another alternative, the starter motor 122 may be deactivated when the engine speed has reached a target idle speed, e.g., 600 revolutions per minute. Then, the engine startup is complete.

Figure 4:
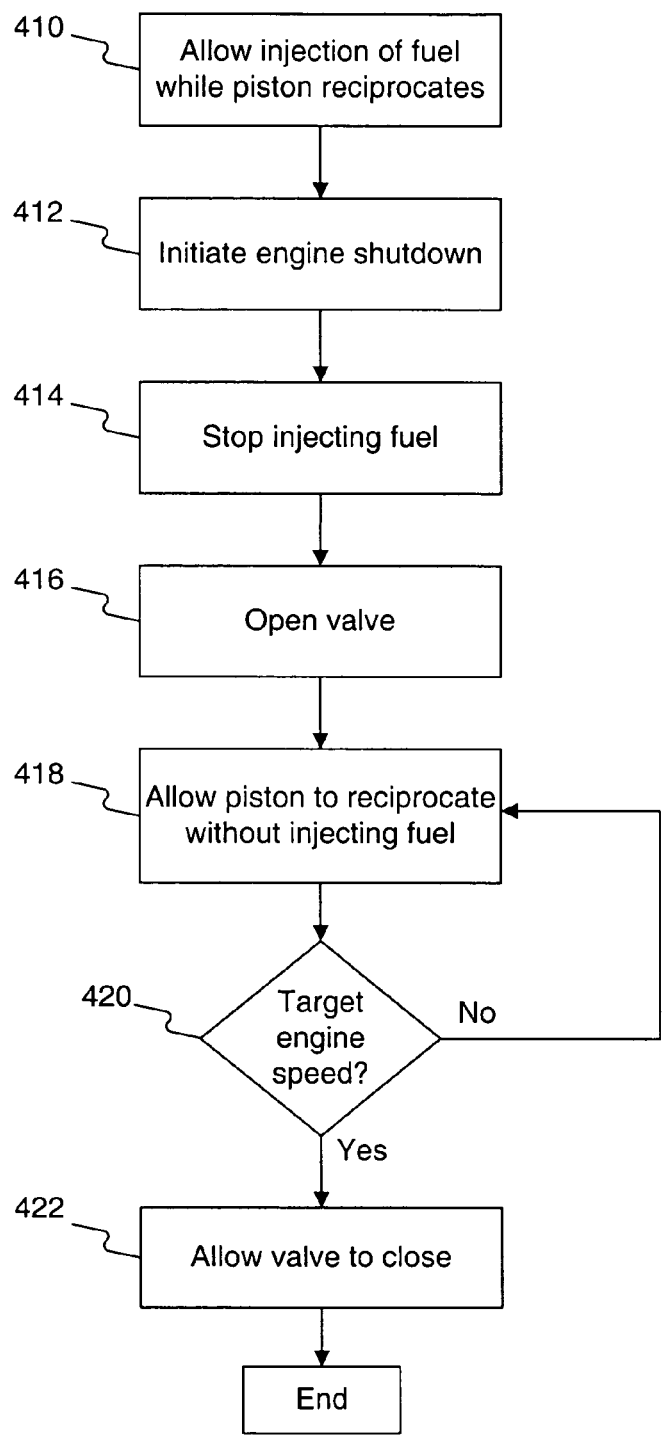
FIG. 4 is a flow chart depicting an exemplary procedure for shutting down an engine.

Referring now to FIG. 4, the operation of the engine 110 including one combustion chamber 112 during engine shutdown is described in detail below. Engine shutdown begins when the engine is operating at a non-zero speed. Before engine shutdown, the intake valve 218 operates first under the second timing procedure and then switches to the first timing procedure. Under the second timing procedure, as described above, the intake valve 218 closes during each engine cycle to allow combustion to occur in the combustion chamber 112 as indicated in step 410.

Then, the controller 244 initiates engine shutdown, as indicated in step 412. Engine shutdown may be characterized as starting when fuel stops being injected into the combustion chambers 112 and ending when the engine speed is zero. The controller 244 may initiate engine shutdown when the controller 244 has determined that the energy storage device has finished recharging. Alternatively, the controller 244 may begin engine shutdown based on other conditions, e.g., a predetermined time interval, or after receiving a signal from another component or sensor, e.g., when a button is pressed.

As indicated in step 414, the controller 244 then controls the fuel injector assembly 240 to stop injecting fuel into the combustion chamber 112. Then, while the piston 212 reciprocates in the combustion chamber 112, the intake valve 218 operates under the first timing procedure described above. When operating the intake valve 218 under the first timing procedure, the four strokes described above are repeated. The intake valve 218 is opened during the intake stroke, as indicated in step 416, and as the intake valve 218 is held open, fuel is not injected into the combustion chamber 112, as indicated in step 418. Since the combustion chamber 112 is no longer firing, the engine speed decreases from a non-zero speed to zero due to various sources of losses, such as, for example, friction between the crankshaft 213 and the bearings supporting the crankshaft 213, friction between the piston 212 and the wall of the combustion chamber 112, and work by the piston 212 to pull air into and push air out of the combustion chamber 112.

The controller 244 monitors at least one operating condition to determine when to stop cycling the engine 110 using this first timing procedure. In the exemplary embodiment, the controller 244 monitors engine speed, as indicated in step 420. For engine shutdown, the controller 244 may stop cycling the engine 110 using the first timing procedure when the engine 110 is at zero speed or at a predetermined low target speed. Alternatively, the controller 244 may use other conditions, such as another engine condition or the amount of time elapsed since initiating engine shutdown.

When the controller 244 has determined that the target engine speed has been reached, the valve actuator 233 allows the intake valve 218 to close, as indicated in step 422. Then, the engine shutdown is complete. It is to be understood that if the engine 110 has already reached zero speed before the valve actuator 233 allows the intake valve 218 to close, the intake valve 218 may not actually be closed at the end of the shutdown process.

An exemplary engine 110 includes six combustion chambers 112, each having one intake valve 218 and each following a different timing pattern. That is, the combustion chambers 112 are each in different stages of the engine cycle when the engine 110 is running. For example, according to the exemplary embodiment, when the location of the piston 212 in a first combustion chamber corresponds to approximately 0° crank angle, the location of the piston 212 in a fifth combustion chamber corresponds to approximately 120° crank angle, the location of the piston 212 in a third combustion chamber corresponds to approximately 240° crank angle, the location of the piston 212 in a sixth combustion chamber (the combustion chamber 112 closest to an engine flywheel) corresponds to approximately 360° crank angle, the location of the piston 212 in a second combustion chamber corresponds to approximately 480° crank angle, and the location of the piston 212 in a fourth combustion chamber corresponds to approximately 600° crank angle. It is to be understood that the differences in crank angles may be modified.

During the engine startup, since the combustion chambers 112 begin the intake stroke of the engine cycle in a staggered manner (due to the 120° differences in crank angles), the intake valves 218 of the combustion chambers 112 also begin to operate under the first timing procedure in a staggered manner. Thus, under the first timing procedure, all of the intake valves 218 are held open by the corresponding valve actuators 233 until the predetermined condition is satisfied, i.e., until reaching the target engine speed (step 320). Then, the controller 244 allows the intake valves 218 to close (step 322) and allows the intake valves 218 to start operating under the second timing procedure to allow the combustion chambers 112 to fire. This transition from first timing procedure to second timing procedure occurs in a staggered manner due at least to the differences in crank angles between the combustion chambers 112. One-by-one, the controller 244 begins to operate each of the intake valves 218 under the second timing procedure until all of the combustion chambers 112 are firing. At this time, engine startup is complete and the engine speed is non-zero. Since the combustion chambers 112 are fired in a staggered manner and not together at the same time, vibrations and noise may be reduced.

The following procedure describes an exemplary method for shutting down the engine 110 having more than one combustion chamber 112. Before shutting down the engine 110, all of the combustion chambers 112 are firing and the intake valves 218 are operating under the second timing procedure. When engine shutdown begins, the intake valves 218 transition one-by-one in a staggered manner from the second timing procedure to the first timing procedure. This transition from second timing procedure to first timing procedure occurs in a staggered manner due at least to the differences in crank angles between the combustion chambers 112. For example, after each piston 212 reaches a position corresponding to 0° crank angle, the controller 244 begins operating the corresponding intake valve 218 using the first timing procedure, thereby allowing the intake valve 218 to be opened by the cam 234 and held open by the valve actuator 233. Thus, the combustion chambers 112 stop firing in a staggered manner. Fuel is not injected into the combustion chamber 112, and as a result, the combustion chamber 112 does not fire and the engine speed begins decreasing. All of the intake valves 218 are held open by corresponding valve actuators 233 until the predetermined condition is satisfied, i.e., until reaching the predetermined low target engine speed or zero speed (step 420). Then, the controller 244 allows the intake valves 218 to close (step 422). Due to the action of the cam 234 on the intake valves 218 and the differences in crank angles for the combustion chambers 112, not all of the intake valves 218 may be closed when the engine 110 reaches zero speed.

Alternatively, the engine 110 may be used in other applications, for example, hybrid applications that combine two sources of power, e.g., diesel power and electric power. In this type of hybrid application, an electric motor and a diesel engine may be provided as power sources. The above timing procedures may be implemented for an anti-idling strategy for the diesel engine in the hybrid application.

The operation of the valve actuator 233 may prevent piston-to-valve contact. Although the intake valves 218 are held open while the piston 212 moves in the combustion chambers 122, the lift of the intake valves 218 is controlled to ensure that there is no contact with the reciprocating piston 212. As shown in FIG. 2, the intake valve 218 reaches its maximum lift position during the intake stroke while the piston 212 is descending. The intake valve 218 does not remain at the maximum lift position. Instead, the intake valve 218 may drop to a lower lift position until the valve actuator 233 allows the intake valve 218 to close. As a result, piston-to-valve contact may be prevented, thereby preventing damage to the engine and increasing engine life.

As another alternative, instead of, or in addition to, modifying the closing timing of the intake valves 218, the closing timing of the exhaust valves 219 may be modified. For example, the exhaust valves 219 may be opened by the corresponding cams 234 and may be held open by the corresponding valve actuators 233 until the predetermined target engine speed is reached.

As yet another alternative, instead of modifying the closing timing of the intake valves 218 and/or the exhaust valves 219, the intake valves 218 and/or the exhaust valves 219 may be kept closed throughout the entire startup and/or shutdown process using a valve actuating mechanism that prevents the valves 218, 219 from opening until the end of the engine startup and/or shutdown process. While the valves 218, 219 are closed, fuel is not injected into the combustion chamber 112 and the combustion chambers 112 do not fire. While the piston is reciprocating, the air inside the combustion chamber 112 is continuously compressed and expanded.

During engine startup in accordance with the exemplary embodiments, the starter motor 122 provides torque for accelerating the crankshaft 213 from zero speed to a non-zero speed. While the crankshaft 213 accelerates, the pistons 212 are reciprocating in the combustion chambers 112, and fuel is not injected. Substantial compression, ignition, and therefore combustion does not occur in the combustion chambers 112, and therefore, torsional and vibrational forces may be reduced. Compression and fuel injection may start when a target engine speed is reached. Therefore, the vibrations and noise that would typically occur when sharply accelerating the crankshaft 213 and the components connected thereto, such as the pistons 212, during engine startup may be reduced. The engine startup may be smoother, and the engine 110 may be started faster. Power output requirements for the starter motor 122 may be reduced. Additionally, the delay in beginning compression and fuel injection allows the controller 244 to increase the accuracy of the fuel injection timing before actually beginning to inject the fuel.

Likewise, during engine shutdown, while the crankshaft 213 decelerates, the pistons 212 are reciprocating in the combustion chambers 112, and fuel is not injected. Substantial compression, ignition, and therefore combustion does not occur in the combustion chambers 112. The vibrations and noise that would typically occur when sharply decelerating the crankshaft 213 and the components connected thereto, such as the pistons 212, during engine shutdown may be reduced.

Furthermore, the accuracy of the fuel injection timing may be improved. During engine startup, the combustion chambers 112 operate without firing when the intake valves 218 operate under the first timing procedure, and fuel is not injected into the combustion chambers 112. The controller 244 receives signals from the crankshaft position sensor to determine the position of the crankshaft 213 and therefore the positions of the pistons 212 in the combustion chambers 112. The controller 244 uses these signals to determine when to actuate the fuel injector assemblies 240 to inject fuel into the combustion chambers 112. Crankshaft position sensors typically provide more accurate readings at higher crankshaft speeds, e.g., above 600 revolutions per minute. Since the engine 110 is able to gain speed while the combustion chambers 112 are not firing, the controller 244 is able to obtain more accurate readings of the crankshaft position to determine when to inject fuel in each of the combustion chambers 112. After the combustion chambers 112 begin firing, the readings from the crankshaft position sensor are taken at higher speeds and are likely to be more accurate. Therefore, fuel is less likely to be wasted by being injected at the wrong time or by having to use a "double firing" method (when fuel is injected each time the piston 212 is at the TDC position, i.e., at the start of the compression stroke and at the start of the exhaust stroke) or other method of approximating the correct fuel injection timing. As a result, accuracy of the fuel injection timing is improved, thereby enabling the engine 110 to start faster.

In the energy storage device recharging system, noise and torsional and vibrational forces are reduced or eliminated during engine startup and shutdown so that a smoother engine startup and shutdown may be provided, and the driver's sleep can be undisturbed. The energy storage device may be recharged periodically to provide an uninterrupted supply of power to the accessories and systems that are running while the driver sleeps. Additionally, the engine 110 may be shut down after the energy storage device has been recharged so that the engine 110 does not idle while the driver is sleeping, and therefore the driver is not subject to the vibrations and noise produced by an idling engine. Also, during the engine startup and shutdown, fuel is not injected into the combustion chamber 112. As a result, fuel consumption decreases and exhaust emissions may be reduced.

It will be apparent to those skilled in the art that various modifications and variations can be made to the method of controlling engine valve timing. Other embodiments will be apparent to those skilled in the art from consideration of the specification and practice of the disclosed method of controlling engine valve timing. It is intended that the specification and examples be considered as exemplary only, with a true scope being indicated by the following claims and their equivalents.

What is claimed is:

1. A method of controlling an engine during an engine startup or shutdown condition, the method comprising:
   operating a valve to open a port of a combustion chamber of the engine to allow fluid to flow between the combustion chamber and the port for at least one entire engine cycle; and
   preventing combustion of fuel during a combustion stroke of the at least one engine cycle, the at least one engine cycle occurring during the engine startup or shutdown condition,
   wherein the operating of the valve to open the port includes:
     lifting the valve to a first lift position;
     moving the valve from the first lift position to a second lift position, the second lift position being lower than the first lift position; and
     holding the valve at the second lift position.

2. The method of claim 1, wherein the valve is an intake valve or an exhaust valve, and the first lift position is a maximum lift position.

3. The method of claim 1, wherein the preventing of the combustion of the fuel includes substantially stopping introduction of fuel into the combustion chamber during the engine startup or shutdown condition.

4. An engine comprising:
   a combustion chamber including a port;
   a valve configured to close the port;
   a controller configured to control the valve to close the port for at least one entire engine cycle; and
   the controller being configured to prevent combustion of fuel during a combustion stroke of the at least one engine cycle, the at least one engine cycle occurring during an engine startup or shutdown condition.

5. The engine of claim 4, wherein the controller is configured to control the valve to open the port after a predetermined condition is satisfied.

6. The engine of claim 5, wherein the predetermined condition is satisfied when an engine speed equals a predetermined target engine speed, the engine speed is zero, or after a predetermined period of time elapses.

7. The engine of claim 4, further including a fuel injector capable of injecting fuel into the combustion chamber, the controller being configured to stop the fuel injector from injecting the fuel into the combustion chamber during the at least one engine cycle during the engine startup or shutdown condition.

8. The engine of claim 4, wherein the controller is configured to control the valve to close the port for the at least one entire engine cycle so that fluid in the combustion chamber when the port is closed is substantially contained within the combustion chamber during the at least one entire engine cycle.

9. A method of shutting down an engine, the method comprising:
- operating a valve to open a port of a combustion chamber of the engine to allow fluid to flow between the combustion chamber and the port for at least one entire engine cycle; and
- preventing combustion of fuel in the combustion chamber during at least one combustion stroke of the at least one engine cycle.

10. The method of claim 9, further including allowing a speed of the engine to decrease.

11. The method of claim 9, further including:
- determining whether a predetermined condition is satisfied; and
- enabling the valve to close the port after determining that the predetermined condition is satisfied.

12. The method of claim 11, wherein the predetermined condition is satisfied when the engine speed equals a predetermined engine speed, when the engine speed is approximately zero speed, or after a predetermined period of time elapses.

13. The method of claim 9, further including:
- monitoring a power level of an energy storage device connected to the engine; and
- determining that the power level of the energy storage device is below a predetermined threshold, wherein the engine shutdown is automatically initiated based on the determination that the energy storage device is below a predetermined threshold.

* * * * *